(12) United States Patent
Shepherd et al.

(10) Patent No.: US 10,613,965 B2
(45) Date of Patent: Apr. 7, 2020

(54) METHOD AND SYSTEM OF VISUALLY COMBINING PROFILING DATA FROM INSTRUMENTATION AND SAMPLING

(71) Applicants: Mark Edward Shepherd, Tiburon, CA (US); Michael James Andrew Smith, San Francisco, CA (US); George Comninos, San Francisco, CA (US); Gavin Murray Peacock, Walnut Creek, CA (US)

(72) Inventors: Mark Edward Shepherd, Tiburon, CA (US); Michael James Andrew Smith, San Francisco, CA (US); George Comninos, San Francisco, CA (US); Gavin Murray Peacock, Walnut Creek, CA (US)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 13/829,844

(22) Filed: Mar. 14, 2013

(65) Prior Publication Data

US 2014/0282416 A1 Sep. 18, 2014

(51) Int. Cl.
*G06F 11/36* (2006.01)
(52) U.S. Cl.
CPC .............................. *G06F 11/3644* (2013.01)
(58) Field of Classification Search
None
See application file for complete search history.

(56) References Cited

U.S. PATENT DOCUMENTS

| 8,074,207 B1* | 12/2011 | Reilly | 717/130 |
| 2005/0067498 A1* | 3/2005 | Smith | G06K 15/02 235/494 |
| 2011/0055427 A1* | 3/2011 | Das | 709/247 |
| 2011/0145838 A1* | 6/2011 | de Melo et al. | 719/318 |
| 2013/0249917 A1* | 9/2013 | Fanning | G06T 11/206 345/440 |

* cited by examiner

*Primary Examiner* — Wynuel S Aquino
(74) *Attorney, Agent, or Firm* — Shook, Hardy & Bacon, L.L.P.

(57) ABSTRACT

Method and systems of visually depicting instrumented and sampled data are provided. A first stream of instrumented data, the instrumented data collected via execution of code contained in a user-scriptable engine. Then a second stream of sampled data is received, the sampled data collected by monitoring execution of code contained in scripts executed by the user-scriptable engine. Then an aggregated version of a portion of the instrumented data and an aggregated version of a portion of the sampled data are simultaneously displayed in one or more viewing regions. Then user interaction with an object pertaining to the aggregated version of a portion of the instrumented data is received. In response to the receiving user interaction with the object pertaining to the aggregated version of a portion of the instrumented data, the aggregated version of the portion of the sampled data is caused to change to depict a different aggregated version of a portion of the sampled data.

19 Claims, 18 Drawing Sheets

METHOD AND SYSTEM OF VISUALLY COMBINING PROFILING DATA FROM INSTRUMENTATION AND SAMPLING

FIELD

The present disclosure relates generally to visualizing combing instrumentation and sampling data.

BACKGROUND

A number of different systems produce large volumes of data that can be more easily understood and managed by visual analysis. Analysis of this data can typically be handled in a number of different ways. One example of a system that produces such data is software known as a profiler. A software profiler uses a form of dynamic program analysis that measures, for example, the memory or time complexity of a software product, the usage of particular instructions, the frequency and duration of function calls, etc. This aids the designer of the software product in the optimization of the software product.

There are a number of different types of items in the analyzed software that can be monitored including, for example, CPU usage, memory usage, GPU usage, function calls, etc. Generally this information can be measured in two ways: by instrumentation or by sampling. Both methods are possible for measuring software programs known as user-scriptable engines. Examples of user-scriptable engines include, but are not limited to, ADOBE FLASH PLAYER™ from Adobe Systems, Inc. of San Jose, Calif. as well as web browsers (such as Chrome™ from Google, Inc. of Mountain View, Calif.) operating hypertext markup language 5 (HTML 5).

Instrumented data is data that is captured via additional program code, or hooks that an external process can attach to, embedded within the functions. In the case of the ADOBE FLASH PLAYER™, these functions are written as C++ native function calls within the user-scriptable engine, for example, and could have additional lines of code added to them which act to record data when the functions are executed. Lightweight instrumentation can be used in such instances, to reduce the overhead that can be attributed to the instrumentation itself. Instrumented data can also cover the case where a function contains hooks, allowing an external process to attach to it and execute code when certain events happen. This instrumented data can be valuable, but it is typically implemented by a developer of a user-scriptable engine, and as such choice of which functions to instrument cannot be easily modified. Sampled data, on the other hand, is generated dynamically at runtime by taking periodic snapshots of the current execution state of the script written by the user. In the case of the ADOBE FLASH PLAYER™, the sampled functions are written in ActionScript.

To the extent that profilers may utilize both instrumented and sampled data, they are treated as separate data streams and not combined in any meaningful way. For example, they may allow a user to switch views between instrumented data views and sampled data views, but not combine such views to be displayed simultaneously in a manner that would allow the user to make meaningful comparisons between the two.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein is a method and system of visually combining profiled data from instrumentation and sampling in order to give a holistic view of the behavior of software. In an example embodiment, the software comprises a user-scriptable engine that executes user scripts.

In an example embodiment, instrumented data is included within sampled data, allowing users to see native engine behavior in-line with their own function calls. In another example embodiment, filtering of samples can be allowed based on instrumented activities. For example, a user can see only the script function calls that were executing inside a specific event handler. In another example embodiment, sampled data is used to give a breakdown of how much time was spent in each script package, which gives more detail than merely how much time was taken executing scripts. The overall time spent executing scripts can be measured using instrumentation.

Figure 1:
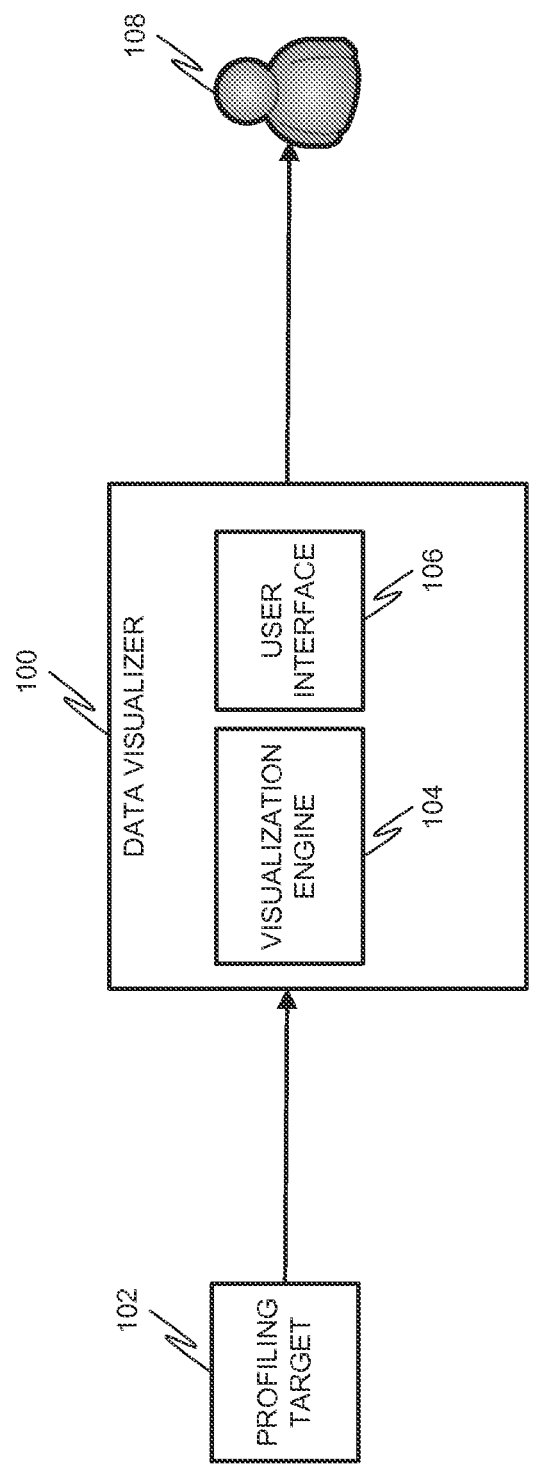
FIG. 1 is a block diagram illustrating a data visualizer in accordance with an example embodiment.

The term "data visualizer" as used throughout this disclosure shall be interpreted broadly to mean any tool used to visually analyze data. FIG. 1 is a block diagram illustrating a data visualizer in accordance with an example embodiment. The data visualizer 100 receives input data from a profiling target 102. The profiling target 102 may, in some example embodiments, also contain a profiler that tracks certain information in the profiling target 102 and creates hierarchical data to output as the input data to the data visualizer 100. The data visualizer 100 may include a visualization engine 104 and a user interface 106. The visualization engine 104 acts to organize the input data and present the input data in a meaningful way to a user 108 via the user interface.

In some example embodiments, the data visualizer 100 in question may interface with a profiler designed to aid programmers or other users in analyzing and optimizing software products. One such profiler is ADOBE SCOUT™ from Adobe Systems, Inc. of San Jose, Calif. ADOBE SCOUT™ is a profiling tool that allows a user to easily identify areas of optimization of created content, such as content compatible with ADOBE FLASH PLAYER™ of Adobe Systems, Inc. of San Jose, Calif.

In some example embodiments, the input data 102 may be received from a user-scriptable engine. Examples of user-scriptable engines include, but are not limited to, ADOBE FLASH PLAYER™ as well as web browsers (such as Chrome™ from Google. Inc. of Mountain View, Calif.) operating hypertext markup language 5 (HTML 5).

ADOBE FLASH PLAYER™ is software used to view multimedia. It typically runs from a web browser or mobile device, allowing multimedia files created for the software to be viewed on a number of different platforms without the need to modify the multimedia files. The multimedia files are stored in a format known as an SWF file. The SWF files contain static data, such as images, and dynamic data, such as scripts. The scripts are usually written in a language known as ActionScript, which are executed at certain points in time to allow for modification of screen objects and to allow for interactivity. The various activities that are executed in ADOBE FLASH PLAYER™ then generally fall into the category of either native commands or user-defined commands. The native commands are commands executing native functionality of the user-scriptable engine, typically written in C++ code, while user-defined commands are, as described above, typically written in ActionScript.

Many SWF files are used to define applications, especially games, that perform a great deal of graphical animation. The basic principle is to redraw the screen at a certain frequency, for example 60 times a second, so that it appears as a smooth animation. Each of these redraws is known as a frame, and the frequency of refreshing is known as the framerate, which can be defined in each SWF file.

Within a frame, ADOBE FLASH PLAYER™ has many different activities to perform. This might include redrawing part of the screen, starting a new file download, mouse, keyboard, or other events, for example. Thus, one common analysis of an SWF file application is to determine whether the activities that need to be performed for a given frame can actually be performed in the amount of time allowed for that frame, given the framerate. For example, if the framerate is 60 times a second, then the activities for a given frame must be able to be performed in $\frac{1}{60}$ of a second, or else the ultimate animation may be appear choppy or otherwise hindered. A profiling tool such as ADOBE SCOUT™ can be used to identify frames that fail this metric and allow the user to easily identify which particular activities are causing the problem. Thus, an application developer may notice that animation appears choppy at a certain point in the application, can use ADOBE SCOUT™ to identify the exact frames that are at issue, and then further analyze which of the activities performed in those frames are at issue.

Figure 2:
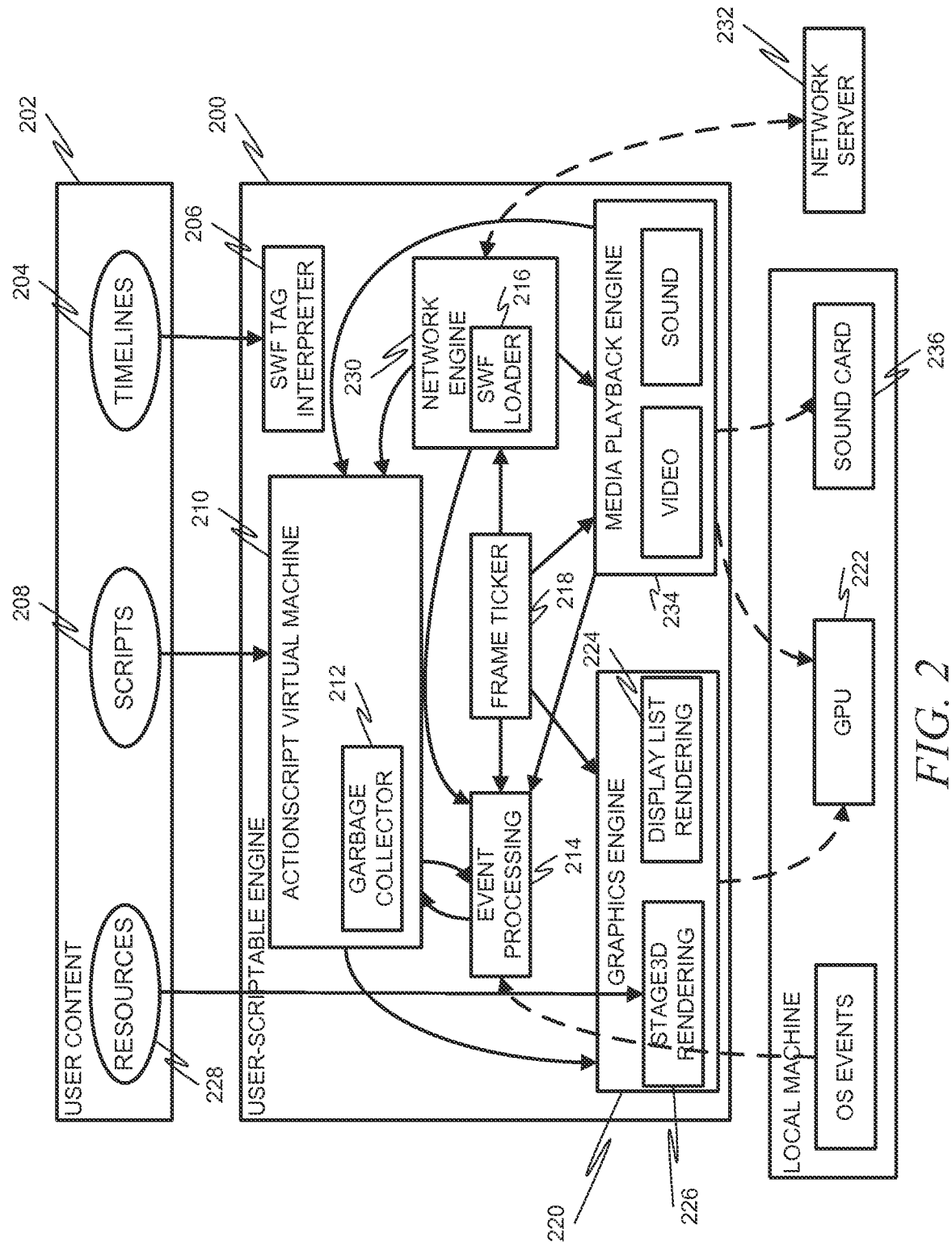
FIG. 2 is a block diagram illustrating a user-scriptable engine, such as ADOBE FLASH PLAYER™.

FIG. 2 is a block diagram illustrating a user-scriptable engine, such as ADOBE FLASH PLAYER™. The user-scriptable engine 200 may receive user content 202. The user content 202 may include timelines 204, which may be interpreted by an SWF tag interpreter 206 on the user-scriptable engine 200. The user content 202 may also include scripts 208, which may be executed by an ActionScript virtual machine 210 on the user-scriptable engine 200. The ActionScript virtual machine 210 implements certain core features of the ActionScript, including garbage collection (by garbage collector 212) and exceptions, as well as acting as a bridge between the scripts 208 and the user-scriptable engine 200.

Event handlers (implemented in the event processing 214) are functions that are registered by the programmer to get called when a specific event happens. Common events are navigation events (e.g., keyboard presses, mouse events, touch and gesture events, etc.) and window events (e.g., resize, full screen, etc.).

ActionScript can take care of the allocation and freeing of memory. The garbage collector 212 is then used to scan for any objects that are no longer being referenced, and free up the memory they are using. A large amount of garbage collection means that there are too many objects being created, something the programmer may wish to learn about and address.

When the user-scriptable engine 200 starts a new user-scriptable engine instance, it first has to download the main SWF, parse it, and load it into memory before it can start to execute it. This is performed by the SWF loader 216.

A frame ticker 218 is a heartbeat that pulses whenever it is time for a new frame to start. At the start of each frame, it executes any timeline tag, invokes any frame scripts on the timeline, and dispatches a few key ActionScript events.

A graphics engine 220 may perform the acts of rendering the actual visuals of the frames, oftentimes utilizing a graphics processing unit (GPU) 222. Display list rendering 224 is the classical approach to rendering in a user-scriptable engine 200. Here, a blank canvas is provided known as a stage and the system draws to it and attaches and positions graphical entities known as display objects. Display objects may include, for example, vector art, bitmaps, text, etc., and they can be nested hierarchically to build a complicated scene. There are a number of steps that can occur when rendering a frame including, for example, calculating dirty regions (ones that include objects that have moved and need to be redrawn), rendering dirty regions, and copying to screen.

Another type of rendering that may be supported by the graphics engine 220 may be Stage3D rendering 226. The basic structure of a Stage3D rendering cycle is to first set up a state of the GPU 222 (e.g., uploading textures, meshes, and shaders) and second to issue a number of draw calls that tell the GPU 222 to render batches of triangles to the target buffer. The finished product can then be presented to the screen.

As the graphics engine 220 operates, it consumes resources 228. These resources 228 may include bitmaps, images, meshes, shaders, etc.

A network engine 230, which may contain the previously mentioned SWF loader 216, may also be used to communicate with a network server 232 to provide streaming or other network services.

Video or sound may be run in a media playback engine 234, which can interface with both the GPU 222 and a sound card 236.

There are a number of different types of items in the user-scriptable engine 200 that can be monitored including, for example, CPU time, memory usage, GPU usage, function calls, etc. Generally this information may be classified into either instrumented data or sampled data. Instrumented data is data that is captured via additional program code, or hooks that an external process can attach to, embedded within the functions. In the case of the ADOBE FLASH PLAYER™, these functions are written in C++ Native function calls within the user-scriptable engine 200, for example, and could have additional lines of code added to them which act to record data when the functions are executed. Lightweight instrumentation can be used in such instances, to reduce the overhead that can be attributed to the instrumentation itself. This instrumented data can be valuable, but it is typically implemented by a developer of a user-scriptable engine 200, and as such the functions that are chosen to be instrumented cannot be easily modified. Sampled data, on the other hand, is interpreted dynamically at runtime. In the case of the ADOBE FLASH PLAYER™, these sampled functions are written in ActionScript.

Regardless of the source of the data, whether from a user-scriptable engine 200 having instrumented data and sampled data, or from a native application having only instrumented data, each piece of data may be assigned a name. In an example embodiment, these names may be assigned to categories, which may be nested, or hierarchical in nature. For example, a particular text rendering function may be assigned to leaf category, such as "text rendering", and is therefore implicitly also a member of any parent categories, such as "rendering."

Generally there are two types of categories. The first is fixed categories. These are categories of functions that are commonly used in the user-scriptable engine or application. This might include, for example, "rendering," "script execution," "garbage collection," etc. These are categories of data that commonly occur regardless of the content and, in an example embodiment, may be hard-coded into the profiler along with the names that map to the fixed categories. For example, the profiler designer may decide that all functions that start with ".rend" get assigned to the "rendering" category. In an example embodiment, filtering may also take place, especially for the less common categories, such that if no data winds up being assigned to the category, it may be filtered out (e.g., hidden from the user).

The second type of category is dynamic categories. Dynamic categories are those that depend on data that isn't available until runtime. Dynamic categories can be thought of as belonging to an infinite set (such as the set of all words). Since the dynamic categories are infinite, they cannot be created all statically and have data assigned to them. Rather, the categories are created as new data is assigned.

Figure 3:
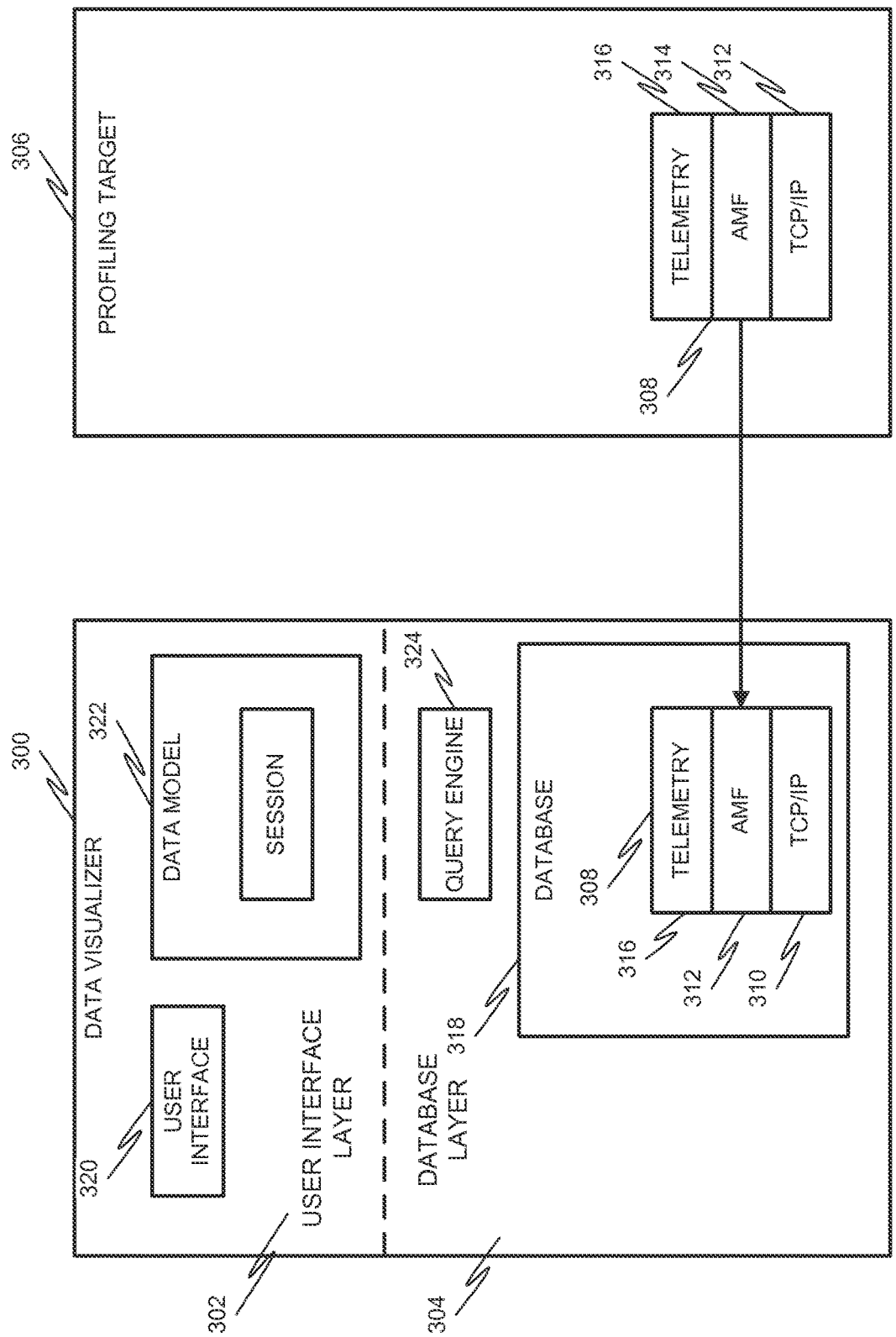
FIG. 3 is a block diagram illustrating a data visualizer in accordance with an example embodiment.

FIG. 3 is a block diagram illustrating a data visualizer 300 in accordance with an example embodiment. The data visualizer 300 may include a user interface layer 302 and a database layer 304. The user interface layer 302 may be constructed in a lightweight multi-paradigm programming language designed as a scripting language having extensible semantics, such as Lua. This is because the user interface layer 302 doesn't need to be fast, as it doesn't deal with as much data. The database layer 304 may be constructed in an object-oriented programming language, such as C++. This is because speed is important in the database layer 304.

The database layer 304 may interact with a profiling target 306 to receive data 308 from the profiling target 306. The profiling target 306 may be any system to be monitored by the profiler 300, but in an example embodiment may specifically be a user-scriptable engine, such as the user-scriptable engine 200 described in FIG. 2 and the corresponding text. The data 308 may contain multiple layers. At the lowest layer, a networking protocol 310, such as TCP/IP, may be used to allow the data to be transferred via any number of different physical or wireless transmission mediums, such as Ethernet, IEEE 802.11 standards (Wi-Fi), Bluetooth, etc. The next layer 312 may be a format used to serialize objects. An example of such a format is the Action Message Format (AMF), which is a binary format used to serialize object graphs such as ActionScript objects and XML, or to send messages between user-scriptable engine clients and remote services. Another example is binary JavaScript Object Notation (JSON). At the top layer is telemetry 314, which is the data about the operation of the profiling target 306 that is being monitored. As described earlier, this telemetry 314 is a protocol layer having specific forms of data that are used for transmitting the data. The data may include instrumented data and/or sampled data, and may be hierarchical in nature. It should be noted that while telemetry 314 is depicted as a single object, it typically is a stream of data. It should be noted that in some embodiments this stream may be sent as different Transport Control Protocol/Internet Protocol (TCP/IP) streams, where one stream comes from instrumentation and another stream comes from sampling.

A database 318 may receive and store the data 308 organized into sessions. A session is a discrete period of time and during which monitoring occurs on a specific piece of content (e.g., a specific SWF being examined). A user may define the length of a session by, for example, selecting a recording button of the data visualizer 300 to begin recording telemetry 314 and then selecting a stop button to stop recording the telemetry 314. The sessions can each store data from multiple streams.

The user interface layer 302 may include a user interface 320 and a data model 322. The data model 322 contains a state for each session, which contains a high-level view of the underlying data 308 as needed. When the user interface 318 receives instructions to navigate through the data 308, such as selecting a particular frame, or altering a frame selection, the instructions are passed through the data model 320 which sends a request to a query engine 324 in the database layer 304. The query engine 324 then generates one or more database queries based on the request, and send them to the database 318, which returns the queried data to the data model 320, which can then arrange for the display of the new data in the user interface 318.

A number of screen captures illustrating various features of example embodiments will now be presented. It should be noted that the discussions of these screen captures will discuss various colors (visual identifications) of elements of the screen captures. Due to the limitations of patent drawings, the colors of elements have been depicted as different patterns, such as hash lines. A legend is provided on each figure to indicate the color that each particular pattern corresponds to. Additionally, many of the textual elements of the screen captures are also intended to have color. To the extent a pattern is depicted behind or on top of text, this is intended to imply that the text itself is presented in the corresponding color, and not intended to imply that a rectangle or other shape containing the color is to be presented behind the text.

Figure 4:
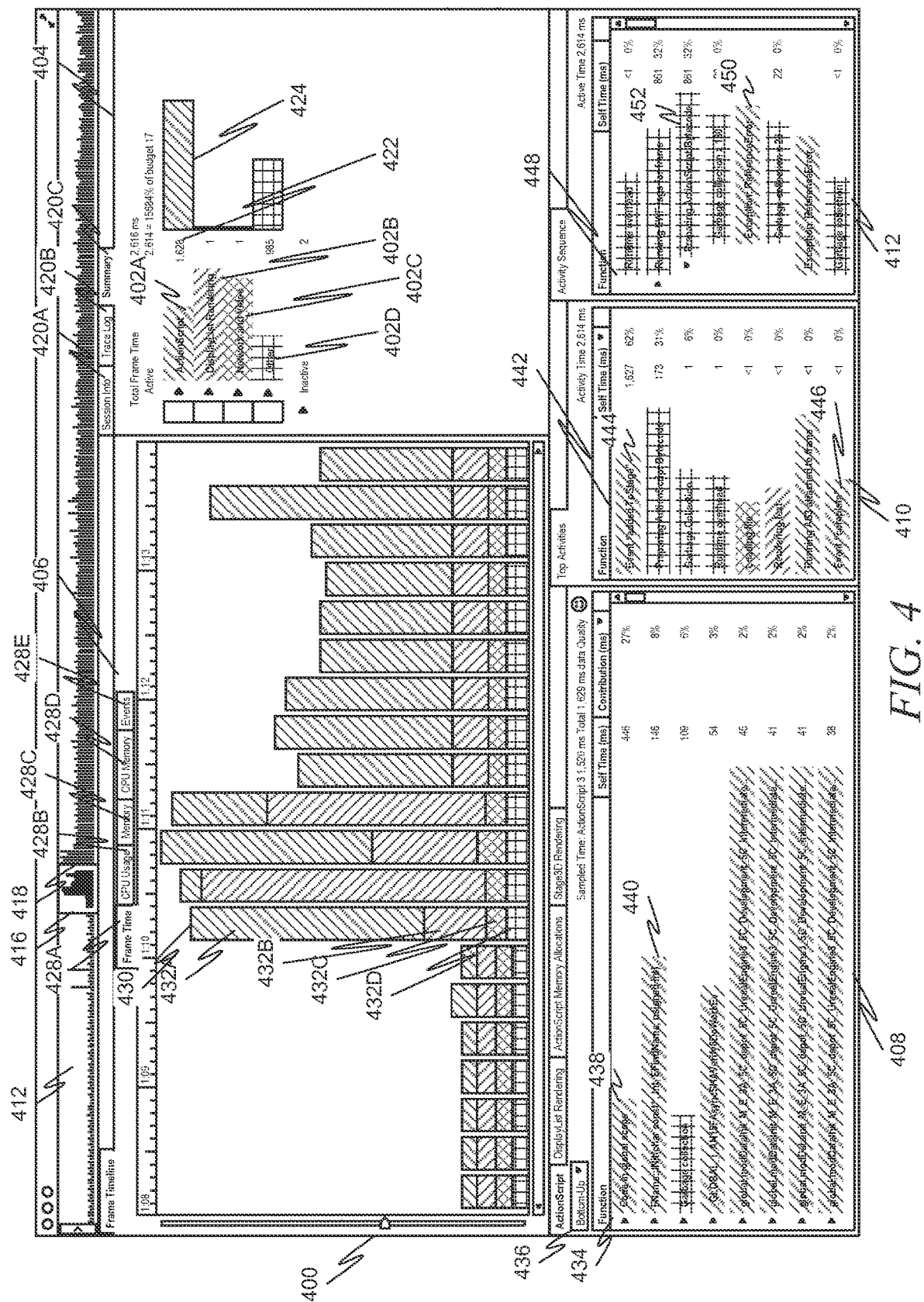
FIG. 4 is a screen capture illustrating a user interface, in accordance with an example embodiment, used to display instrumented and sampled data.

FIG. 4 is a screen capture illustrating a user interface 400, in accordance with an example embodiment, used to display hierarchical data. In this example embodiment, each category 402A-402D of data at a particular level in the hierarchy is depicted in a different color. This color is then carried throughout multiple viewing regions 404, 406, 408, 410, 412, such that items related to a particular category are depicted in a consistent color throughout the entire user interface 400.

The user interface 400 also includes a temporal selection region 414. The temporal selection region 416 allows a user to select a portion of recorded data by, for example, defining starting 416 and ending 418 points. The data between the starting 416 and ending 418 points is then reflected in viewing region 406. Selection of frames in the viewing region 406 affects which data is displayed in the various other viewing regions 404, 408, 410, 412 of the user interface 400. This data represents data collected in multiple selected frames between the starting 416 and ending 418 points. Viewing region 404 depicts a summary view of the data.

A series of tabs 420A, 420B, 420C are provided to allow the user to select different panels to display. Here the user has selected tab 420C, which displays a summary of data. A series of categories 402A-402D are then displayed, along with a textual 422 and graphical 424 depiction of the data. Thus, for example, category 402A related to ActionScript functions, which textual depiction 422 indicated have taken 1,628 ms, and graphical depiction 424 shows a bar line showing the amount of time relative to the other categories 402B, 402C, 402D. Notably, each of the displayed categories 402A, 402B, 402C, 402D are displayed in a different color. These colors are then consistent within the viewing region 404. While FIG. 4 is not shown in color, if one assumes that the color selected for the ActionScript category 402A is blue, then the text object for the ActionScript category 402A is depicted in blue, as is the graphical representation 424. The same is true for to the other categories 402B, 402C, 402D. Textual depiction 422 is not in color in this example embodiment, but may be in other embodiments.

Not only is the color consistent within viewing region 404, this color remains consistent throughout each of the other viewing regions 406, 408, 410, 412. Viewing region 406 is a graphical representation of the data viewed temporally, specifically a frame timeline. Thus, a time axis 426 is provided, and the data can be organized in slices of time. As with viewing region 404, the user may select different data measurements to depict, including frame time 428A, CPU 428B, memory 428C, GPU memory 428D, and events 428E. Notably, each time slice graphically depicts a total measurement across all categories (depicted as the total size of the bar line, such as bar line 430), along with visually breaking down this total measurement by category. In the time slice corresponding to bar line 430, for example, one can see the total CPU time used by frames in this time slice by viewing the total size of the bar line 430, but one can also see how much of this total CPU time was due to individual categories by viewing the individual segments 432A, 432B, 432C, 432D of the bar line 430. Notably, the coloring of the segments 432A, 432B, 432C, 432D correspond to the coloring of the categories provided in viewing region 404. The CPU time attributable to ActionScript, for example, is depicted in blue at segment 432A, allowing the user to easily tell that ActionScript has taken up a significant percentage of the CPU time in this time slice, without any labeling in the viewing region 406 needed to convey this information.

Viewing region 408 depicts an ActionScript panel, including a list 434 of function calls. A user can select drop-down menu 436 to select between depicting a top-down view, where the entry point of the call stack is at the top and the innermost calls are at the bottom of the stack, or a bottom-up view, wherein how much time is spent in individual functions is depicted. Here, the user has selected bottom-up. Notably, the function calls depicted in the list 434 are color-coded in the same manner as viewing region 404, 406. The function calls relating to ActionScript calls are depicted in blue, as can be seen in, for example, function call 438. Garbage collection, as can be seen in for example, 440, is depicted in orange, the same color as its parent category "other" 402D in viewing region 404. The data in the ActionScript panel may come from sampling.

Viewing region 410 depicts top activities within the data. Rather than breaking down time into high-level categories, this shows a detailed breakdown of activities 442, such as those handling specific events. Thus, the data in this panel is aggregated—it adds up all the time spent in a specific activity. The colors depicted for the activities 442 are consistent with the colors for the corresponding hierarchical categories as displayed in the other viewing regions 404, 406, 408, 412. Thus, for example, activity 444 is depicted as blue because the underlying activity, the event "addedToStage", is an ActionScript activity. Likewise, activity 446 is depicted as green because the underlying activity, the rendering of text, is a DisplayList rendering activity. Since the aggregation is at the level of the raw names given to the data as it was collected, the only indication of categories is by color. The data in viewing region 410 may come from instrumentation.

Viewing region 412 depicts the activity sequence. While viewing region 410 shows which activities are taking the most time, it can often be useful to see the precise sequence of each activity. Unlike viewing region 410, which aggregates data over multiple frames, viewing region 412 shows information for only a single frame, but shows the precise order and nesting of activities 448 in a single frame. It should be noted that data that falls below a certain threshold, such as activities that take less than 0.5 ms, can be filtered out of one or more of the viewing regions 404, 406, 408, 410, 412 to allow the user to concentrate on more time-consuming operations. In this example, it is filtered out of viewing regions 410 and 412, but not to the other viewing regions. The colors depicted for the activities 448 are consistent with the colors for the corresponding hierarchical categories as displayed in the other viewing regions 404, 406, 408, 410. Thus, for example, activity 450 is depicted as blue because its underlying activity, an exception, is an ActionScript activity. A parent activity, however, namely activity 452, which may have caused activity 450 to run, may be depicted in orange as its underlying activity, preparing ActionScript bytecode, and may fall under the "Other" category. It should be noted that the hierarchy of activities is distinct from, and orthogonal to, the hierarchy of categories. The data in viewing region 412 may come from instrumentation.

Figure 5:
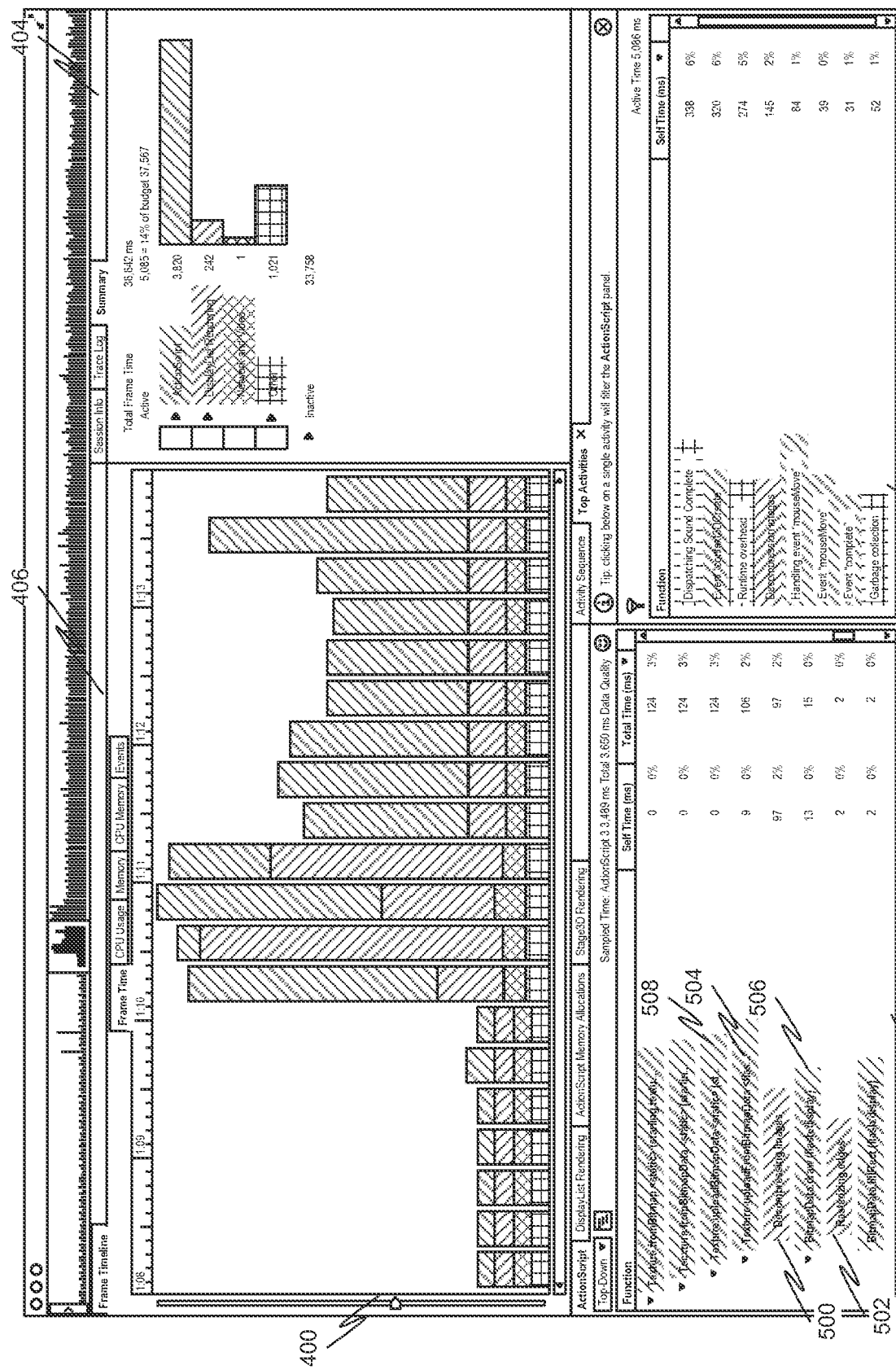
FIG. 5 is a screen capture illustrating the user interface, in accordance with an example embodiment, used to display instrumented and sampled data, in another state following user interaction.

FIG. 5 is a screen capture illustrating the user interface 400, in accordance with an example embodiment, used to display instrumented and sampled data, in another state following user interaction. Here, the user has elected to scroll down in the ActionScript panel in viewing region 408, as well as close the Activity Sequence viewing region 412. This allows the user to see native functions (with data obtained from instrumentation), such as "decompressing images" 500 and "rasterizing edges" 502 in the same viewing region 408 as the script functions (with data obtained from sampling), such as "Texture_uploadFromBitmapData<static>" 504. Notably, the native functions depicted in this viewing region 408 are functions that happen internally in the user-scriptable engine, as a consequence of script execution. This could be, for example, part of an Application Program Interface (API) call (that calls into native functions), or something that got triggered as the script was executing (like garbage collection). These are shown nested underneath ActionScript functions that call the corresponding functions. Thus, "rasterizing edges" 502, for example, was called by, or at least ran during the operation of, "BiptmapData.draw (flash.display)" 506, which itself was called by, or run during the operation of, "Texture.uploadBitmapData <static>" 508. Thus, the instrumented activities resulting from ActionScript calls into native calls are added onto the end of the call stack. In some example embodiments, instrumented data from ActionScript may be interleaved with sampled ActionScript calls on the call stack.

Figure 6:
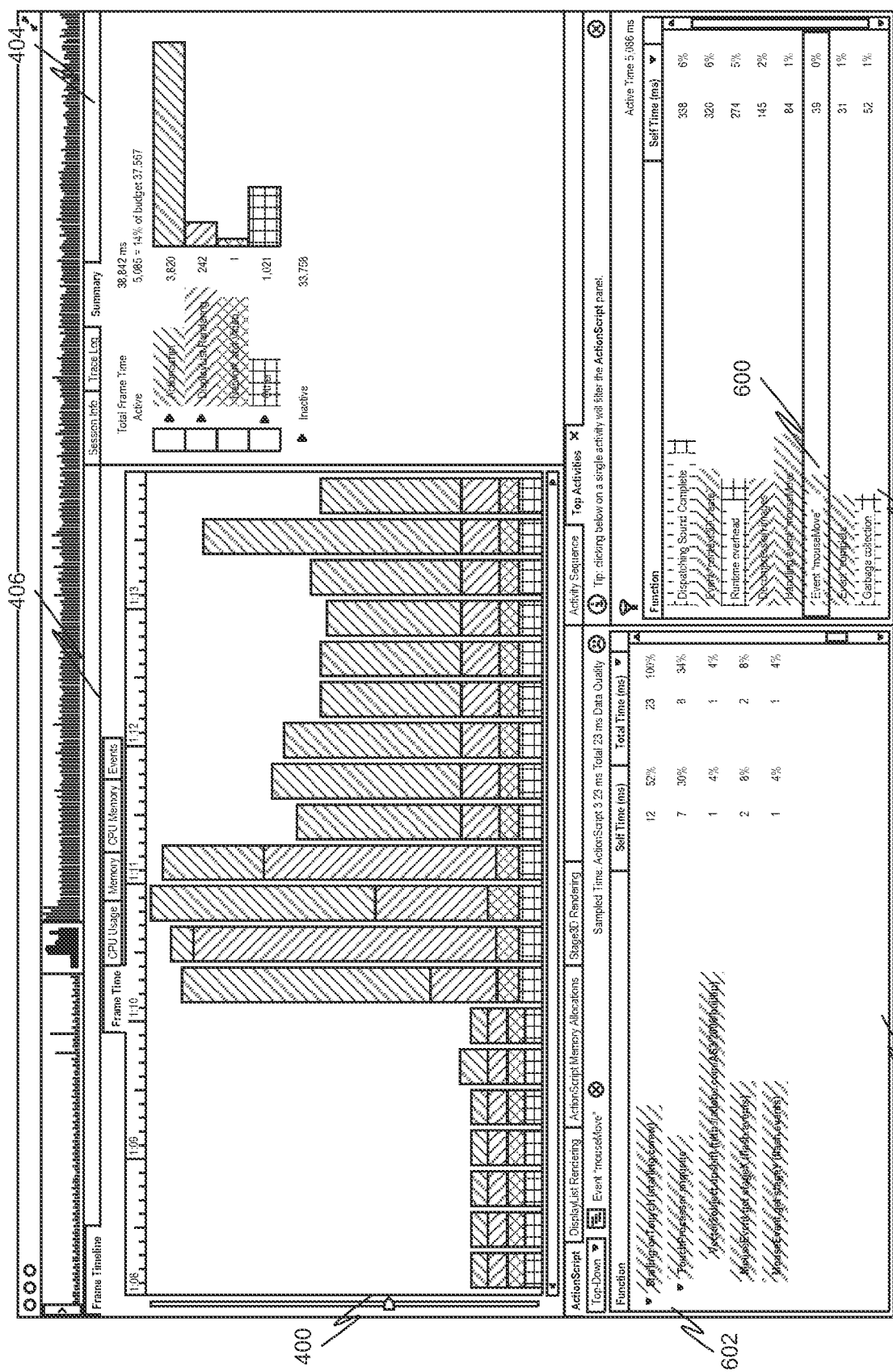
FIG. 6 is a screen capture illustrating the user interface, in accordance with an example embodiment, used to display instrumented and sampled data, in another state following user interaction.

FIG. 6 is a screen capture illustrating the user interface 400, in accordance with an example embodiment, used to display instrumented and sampled data, in another state following user interaction. Here, the user has selected a "mousemove" event 600 (an event obtained by instrumentation) in viewing region 410, specifically in the "Top Activities" panel. This filters the Actionscript panel in viewing region 408 so that only those samples that were taken during the "mousemove" event handlers are displayed, here shown at 602. It should be noted that there are multiple "mousemove" events in the selection, and all samples that occurred inside any of the instrumented activities with that name are displayed.

Figure 7:
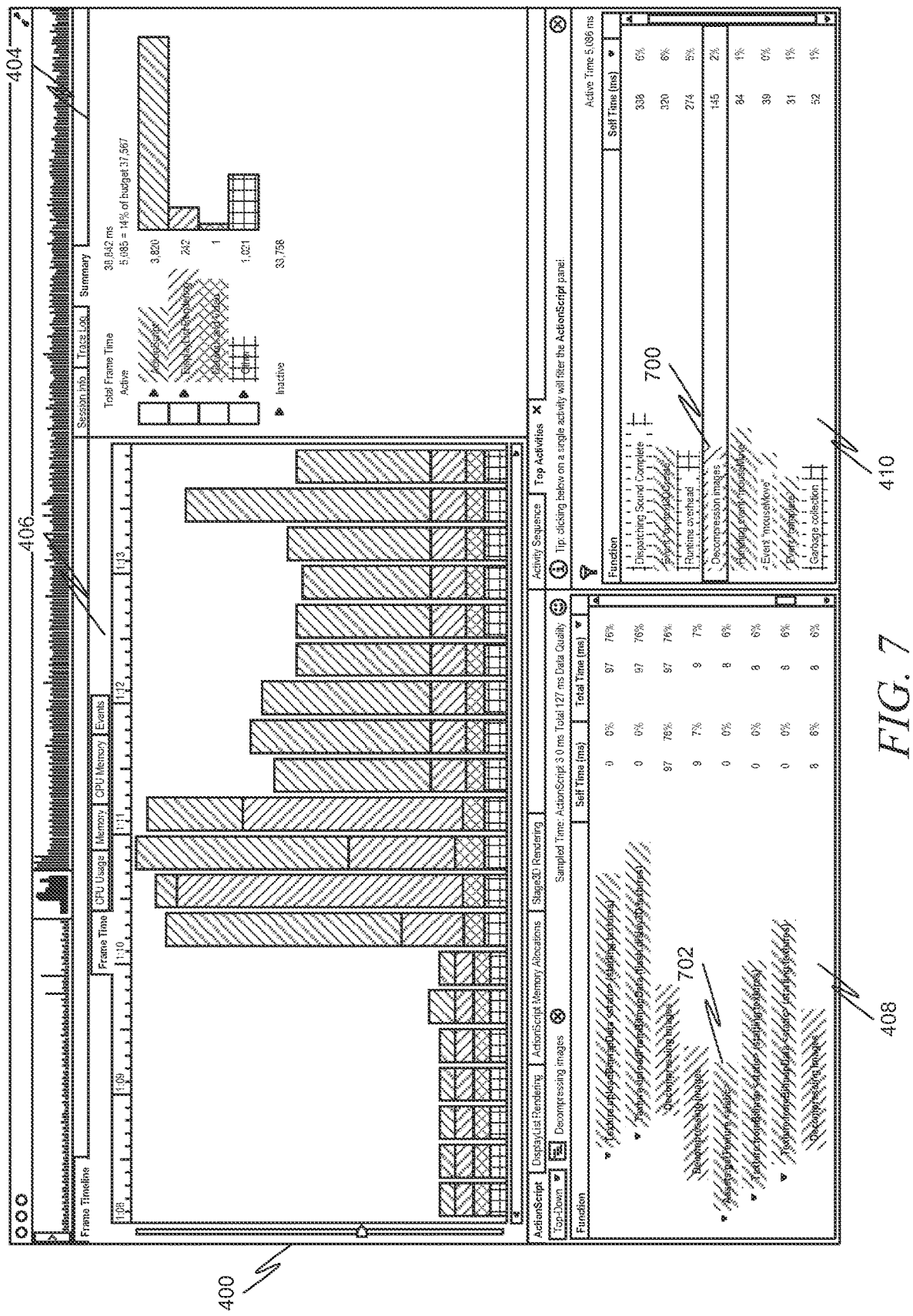
FIG. 7 is a screen capture illustrating the user interface, in accordance with an example embodiment, used to display instrumented and sampled data, in another state following user interaction.

FIG. 7 is a screen capture illustrating the user interface 400, in accordance with an example embodiment, used to display instrumented and sampled data, in another state following user interaction. Here, the user has selected "decompressing images" 700 in viewing region 410, specifically in the "Top Activities" panel. This filters the ActionScript panel in viewing region 408 so that only those samples taken while the decompressing images function was executing are shown. Since the measurement of "decompressing images" 700 is obtained via instrumentation, being a native function call, this means that the samples shown in viewing region 408, such as those for Assets.getTexture<stastic> 702, are samples taken from functions that caused the native function (here "decompressing images" 700) to occur (e.g., called from the ActionScript into the native function, at least indirectly).

Figure 8:
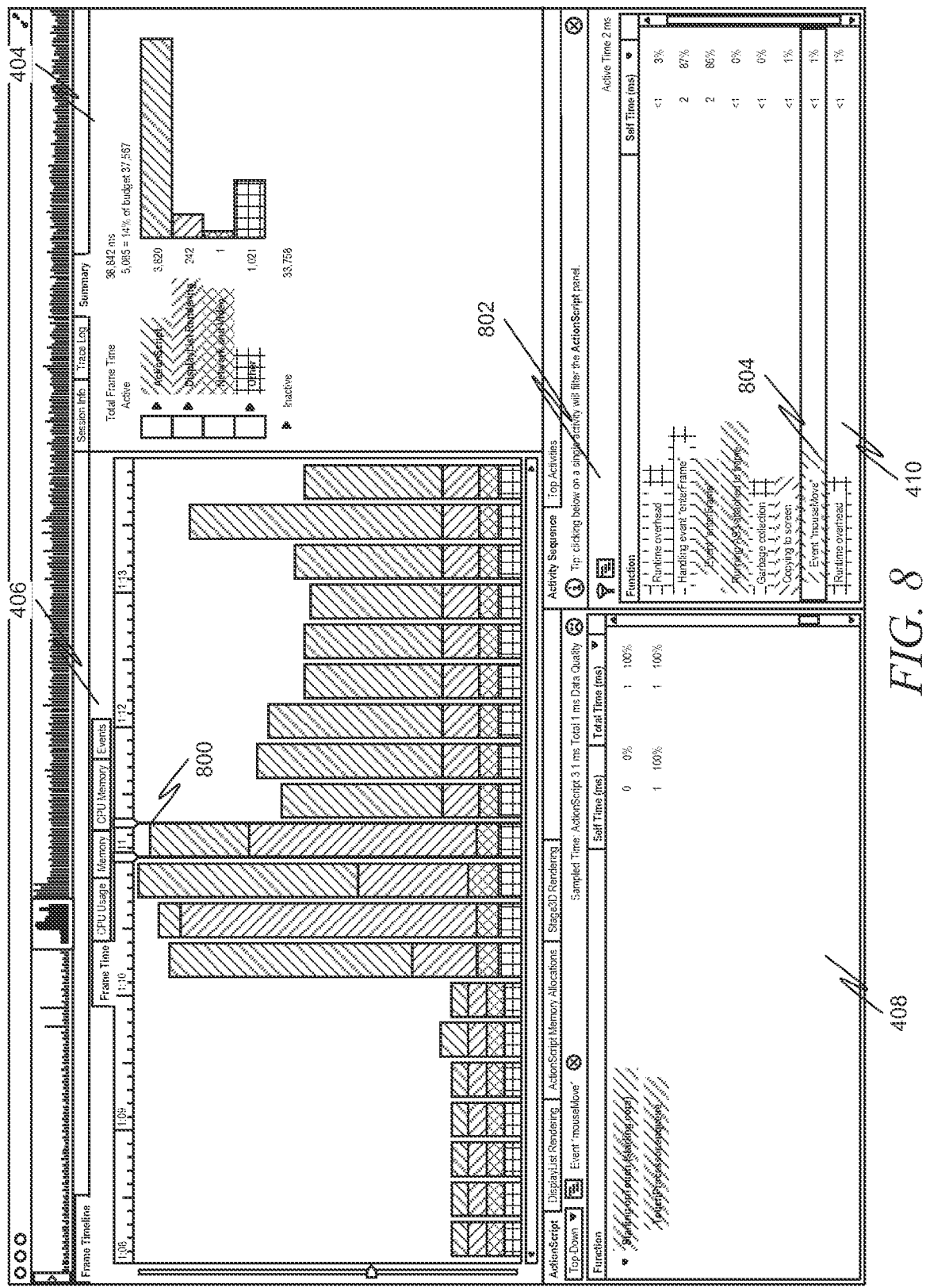
FIG. 8 is a screen capture illustrating the user interface, in accordance with an example embodiment, used to display instrumented and sampled data, in another state following user interaction.

FIG. 8 is a screen capture illustrating the user interface 400, in accordance with an example embodiment, used to display instrumented and sampled data, in another state following user interaction. Here, a single frame 800 is selected in viewing region 406. Viewing region 410, now showing an activity sequence panel 802, now depicts the exact sequence of instrumented activities in the frame. Clicking on an activity here, such as Event "mousemove" 804, filters the ActionScript panel in viewing region 408 to show only samples that were taken inside that specific instrumented function (in contrast to the filtering that occurred previously from a Top Activities panel, which aggregated over a time period all the samples in all places instrumented with a certain name).

Figure 9:
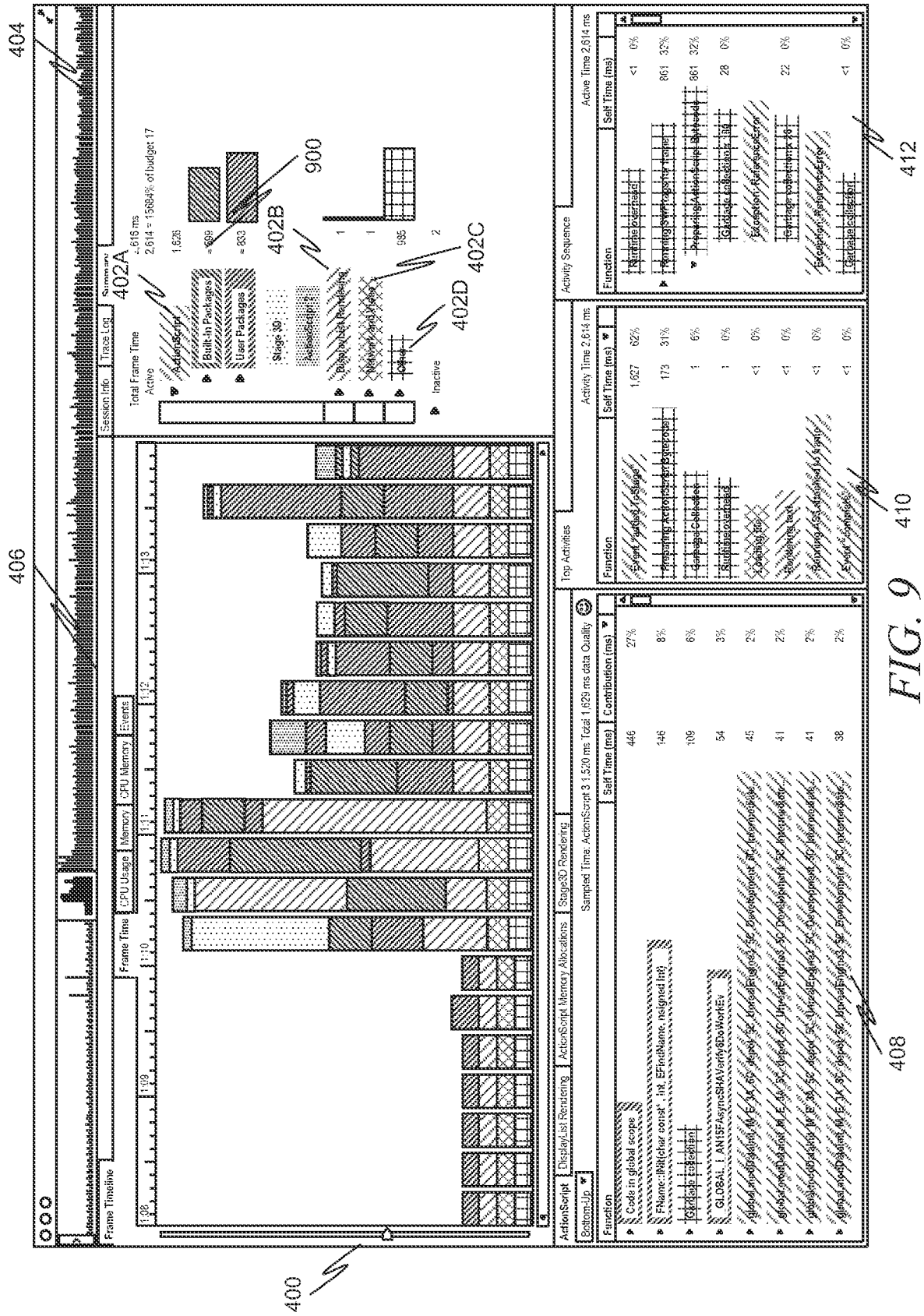
FIG. 9 is a screen capture illustrating the user interface, in accordance with an example embodiment, used to display instrumented and sampled data, in another state following user interaction.

FIG. 9 is a screen capture illustrating the user interface 400, in accordance with an example embodiment, used to display instrumented and sampled data, in another state following user interaction. Here, the user has expanded a category 402A of the summary panel in viewing region 404. The data for the subcategories of category 402A comes from sampled data. The data for the parent category 402A, along with categories 402B, 402C, and 402D, on the other hand, comes from instrumented data. As can be seen, an "≈" sign 900 is depicted next to aggregated sampled data, indicating that the data is calculated by statistical sampling, and therefore is less precise.

Figure 10:
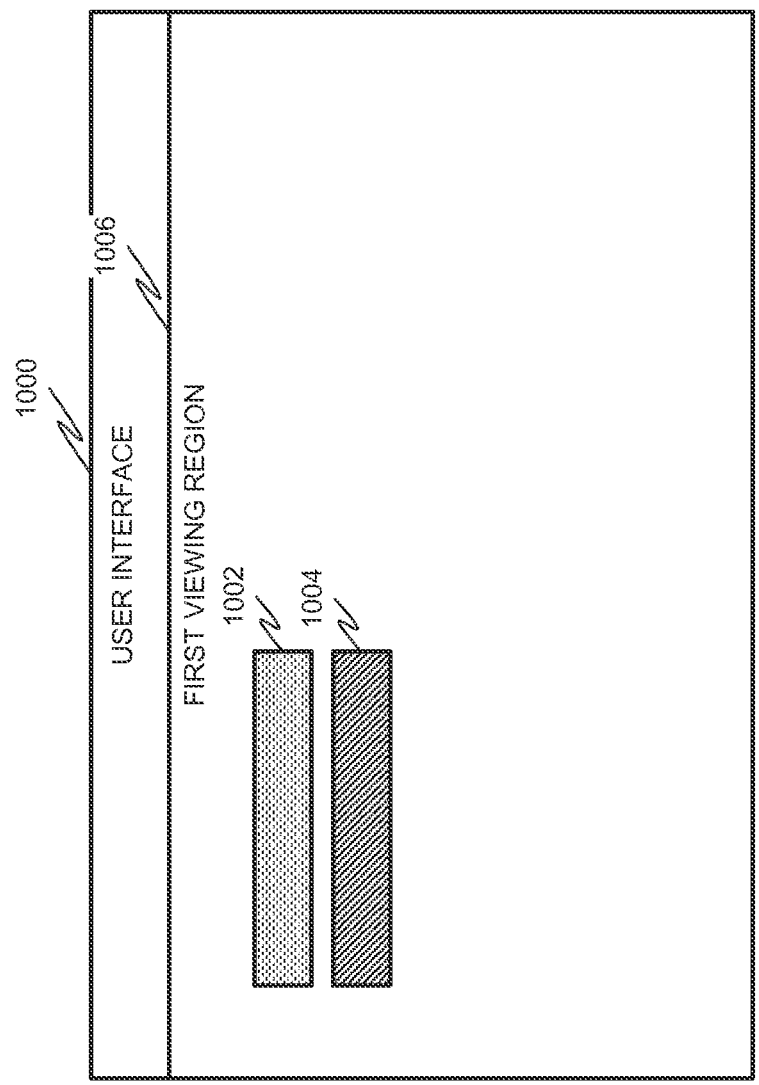
FIG. 10 is a diagram illustrating a user interface, in accordance with an example embodiment, for visually depicting instrumented and sampled data.

FIG. 10 is a diagram illustrating a user interface 1000, in accordance with an example embodiment, for visually depicting instrumented and sampled data. Here, the user interface 1000 simultaneously displays aggregated version of portions of both instrumented data 1002 and sampled data 1004 in a single viewing region 1006.

Figure 11:
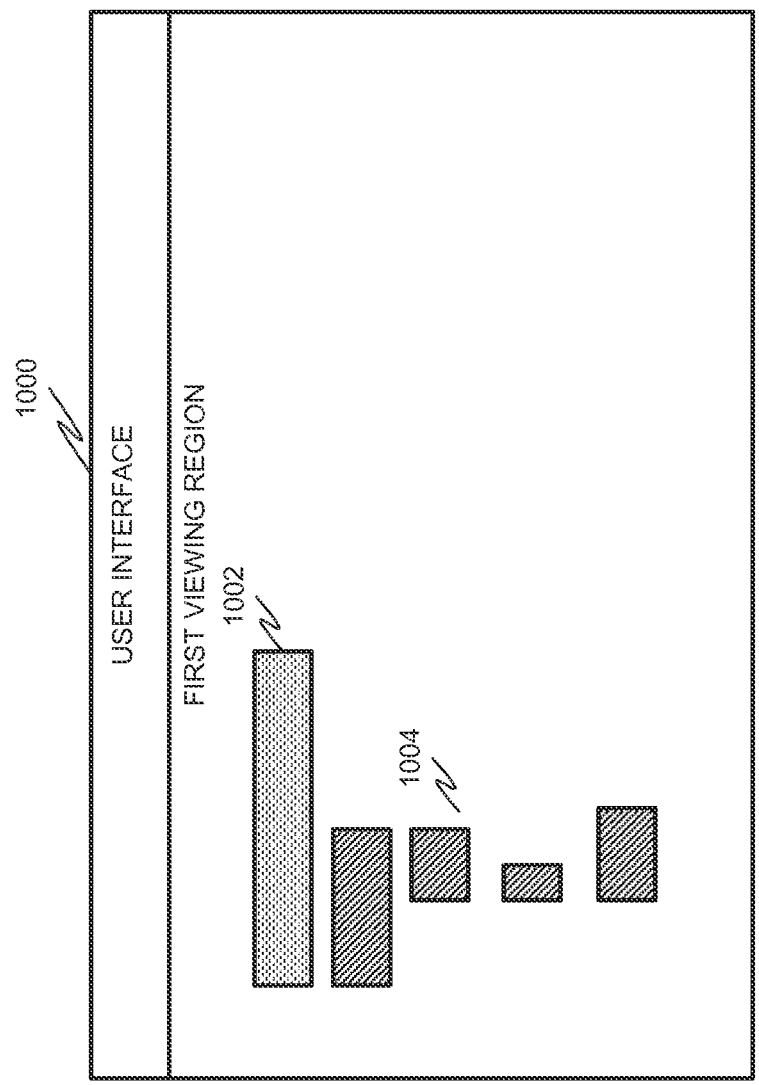
FIG. 11 is a diagram illustrating a user interface, in accordance with an example embodiment, for visually depicting instrumented and sampled data after a selection of a piece of instrumented data.

FIG. 11 is a diagram illustrating a user interface 1000, in accordance with an example embodiment, for visually depicting instrumented and sampled data after a selection of a piece of instrumented data 1002. Here, the selection of a piece of instrumented data 1002 causes a change in the aggregated version of a portion of the sampled data 1004 so that it changes from a first state to a second state. This state change may reflect a number of different possible alterations, including, for example, filtering out of sampled data 1004 unrelated to the selected piece of instrumented data 1002.

Figure 12:
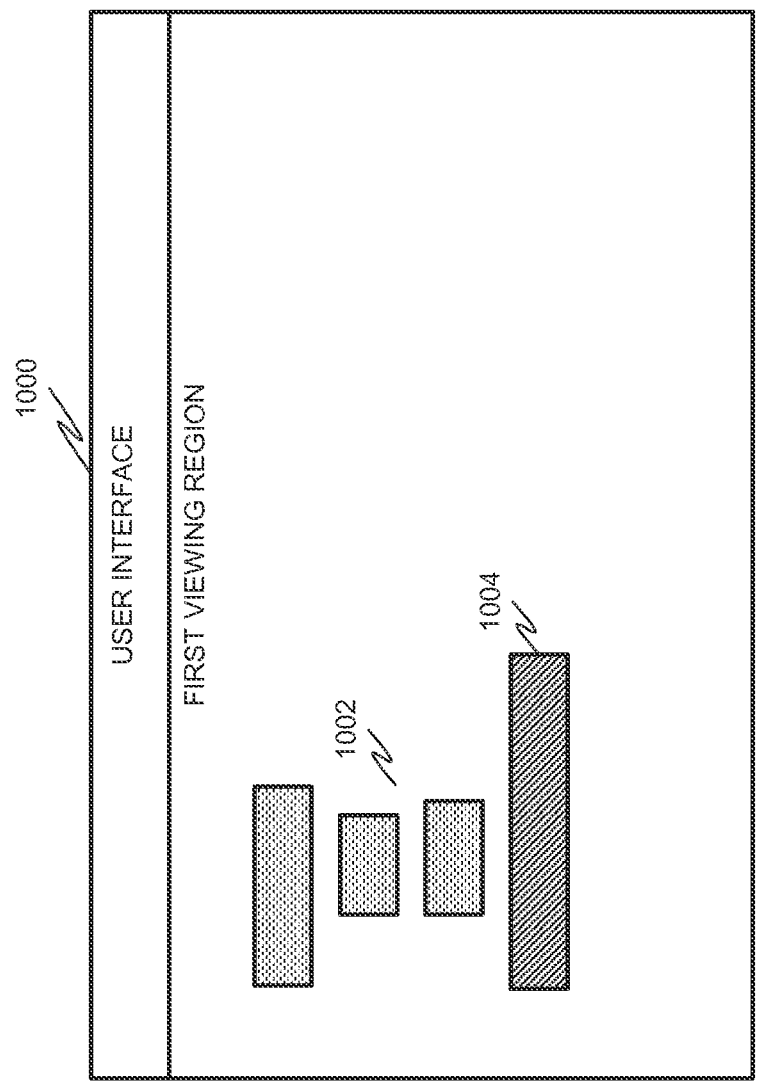
FIG. 12 is a diagram illustrating a user interface, in accordance with an example embodiment, for visually depicting instrumented and sampled data after a selection of a piece of sampled data.

FIG. 12 is a diagram illustrating a user interface 1000, in accordance with an example embodiment, for visually depicting instrumented and sampled data after a selection of a piece of sampled data 1004. Here, the selection of a piece of sampled data 1004 causes a change in the aggregated version of a portion of the instrumented data 1002 so that it changes from a first state to a second state. This state change may reflect a number of different possible alterations, including, for example, filtering out of instrumented data 1002 unrelated to the selected piece of sampled data 1004.

Figure 13:
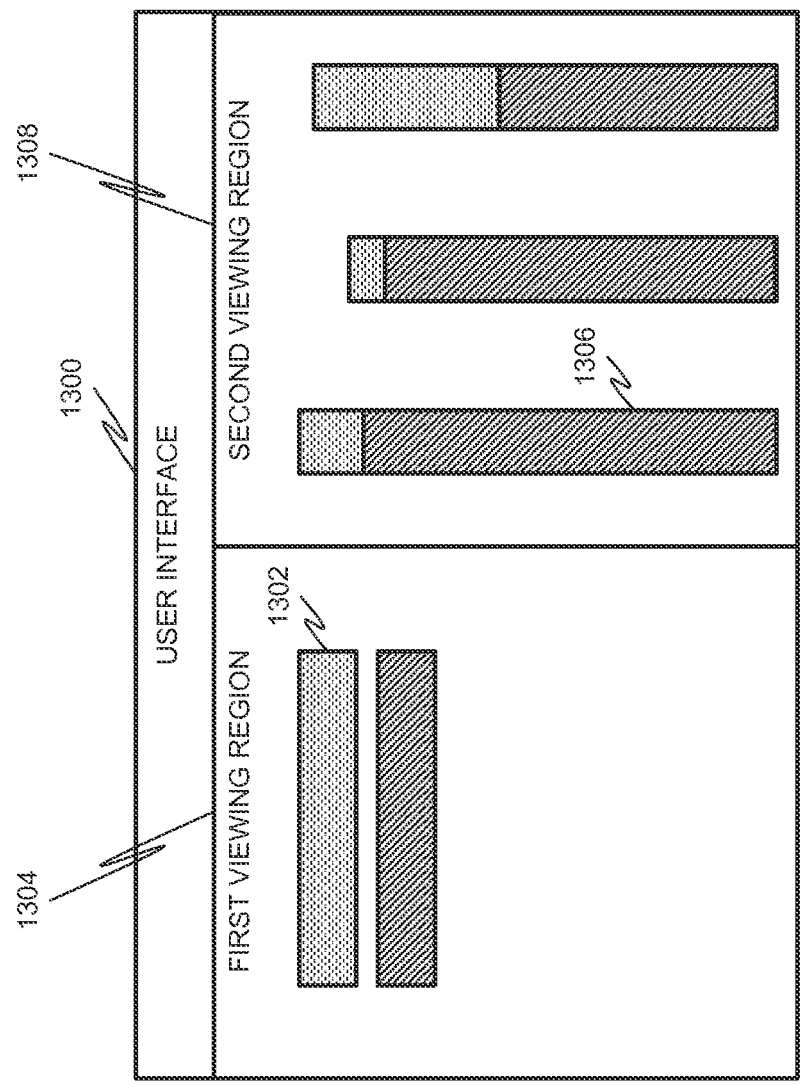
FIG. 13 is a diagram illustrating a user interface, in accordance with an example embodiment, for visually depicting instrumented and sampled data.

FIG. 13 is a diagram illustrating a user interface 1300, in accordance with an example embodiment, for visually depicting instrumented and sampled data. Here, the user interface 1300 simultaneously displays an aggregated version of a portion of instrumented data 1302 in a first viewing region 1304 and an aggregated version of a portion of sampled data 1306 in a second viewing region 1308.

Figure 14:
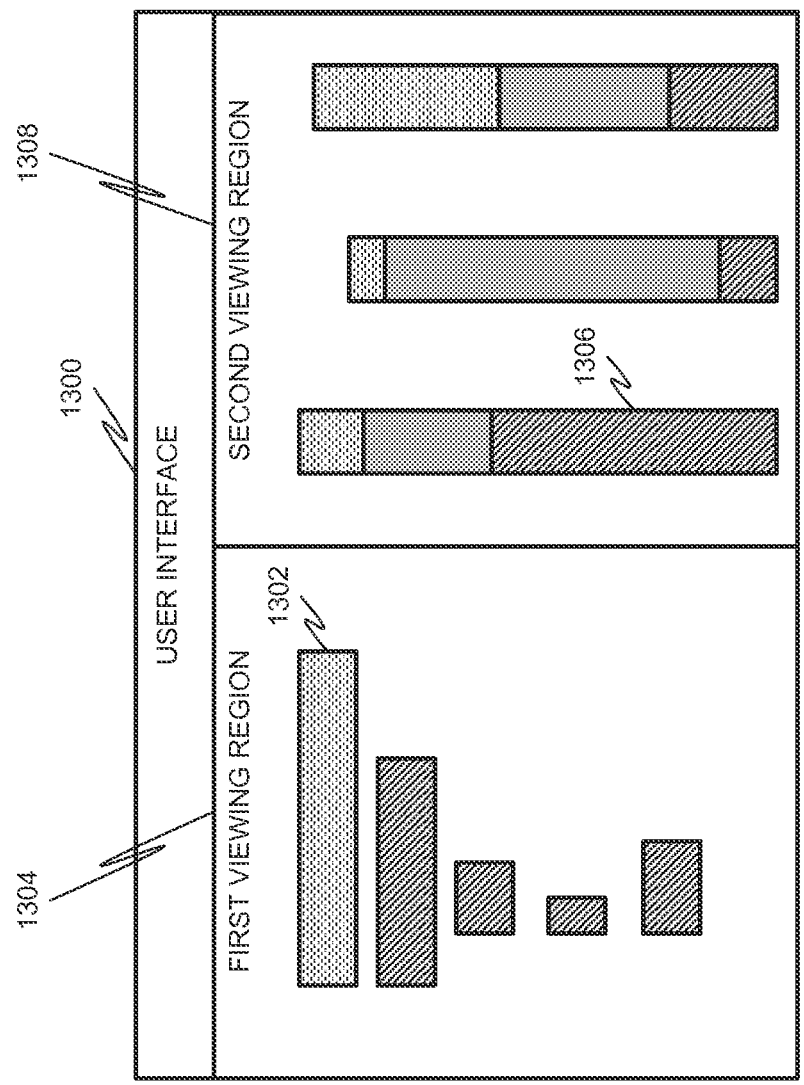
FIG. 14 is a diagram illustrating a user interface, in accordance with an example embodiment, for visually depicting instrumented and sampled data after a selection of a piece of instrumented data.

FIG. 14 is a diagram illustrating a user interface 1300, in accordance with an example embodiment, for visually depicting instrumented and sampled data after a selection of a piece of instrumented data 1302. Here, the selection of a piece of instrumented data 1302 causes a change in the aggregated version of a portion of the sampled data 1306 so that it changes from a first state to a second state. This state change may reflect a number of different possible alterations, including, for example, filtering out of sampled data 1306 unrelated to the selected piece of instrumented data 1302.

Figure 15:
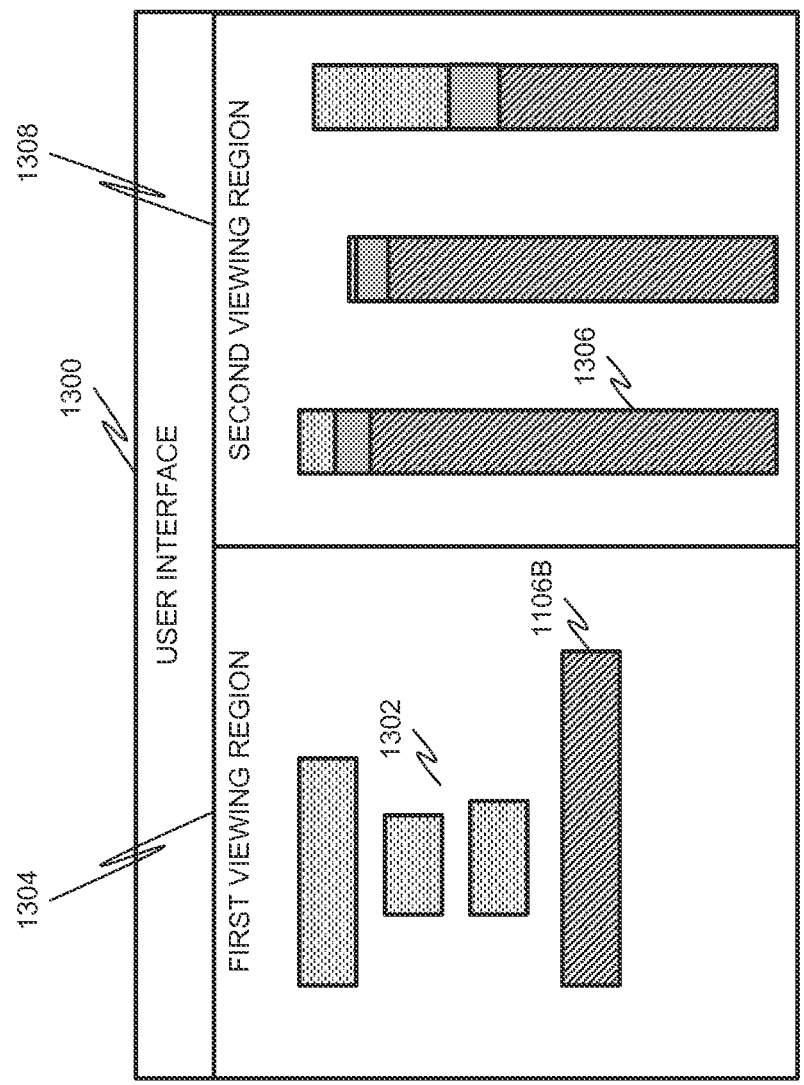
FIG. 15 is a diagram illustrating a user interface, in accordance with an example embodiment, for visually depicting instrumented and sampled data after a selection of a piece of sampled data.

FIG. 15 is a diagram illustrating a user interface 1300, in accordance with an example embodiment, for visually depicting instrumented and sampled data after a selection of a piece of sampled data 1306. Here, the selection of a piece of sampled data 1306 causes a change in the aggregated version of a portion of the instrumented data 1302 so that it changes from a first state to a second state. This state change may reflect a number of different possible alterations, including, for example, filtering out of instrumented data 1302 unrelated to the selected piece of sampled data 1306.

Figure 16:
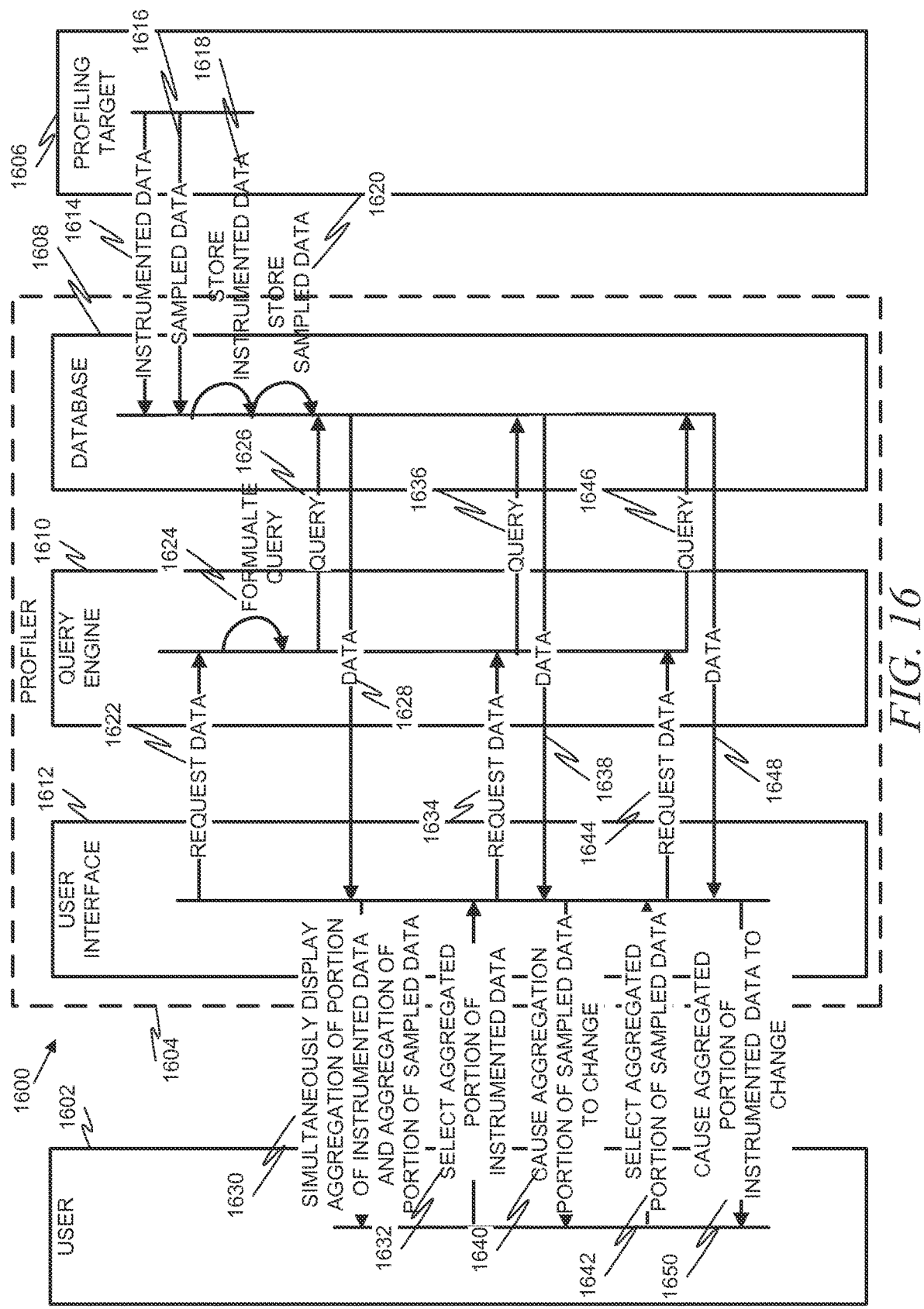
FIG. 16 is an interaction diagram illustrating a method, in accordance with an example embodiment, of visually depicting instrumented and sample data.

FIG. 16 is an interaction diagram illustrating a method 1600, in accordance with an example embodiment, of visually depicting instrumented and sample data. This method 1600 may include a user 1602 interacting with a profiler 1604, which interacts with a profiling target 1606. The profiler 1604 may comprise a database 1608, a query engine 1610, and a user interface 1612. The database 1608 may receive instrumented data from the profiling target 1604 at operation 1614. The database 1608 may receive sampled data from the profiling target 1604 at operation 1616. While these are depicted as two separate operations, in reality these may occur in parallel. At operation 1618, the database 1608 may store the instrumented data. At operation 1620, the database 1608 may store the sampled data. At operation 1622, the user interface 1612 may send a request for data to the query engine 1610, which formulates a query at operation 1624 and sends this query to the database 1608 at operation 1626. At operation 1628, the database 1608 returns appropriate data (e.g., data at a level which corresponds to one or more views attempting to be rendered by the user interface 1612) to the user interface 1612.

At operation 1630, the user interface 1612 simultaneously displays an aggregation of a portion of the instrumented data and an aggregation of a portion of the non-instrumented data. At operation 1632, the user interface 1612 may receive user interaction with an aggregation of a portion of the instrumented data. At operation 1634, the user interface 1612 may send a request to the query engine 1610 for data related to the interacted-with aggregation of a portion of the instrumented data (e.g., sampled data pertaining to non-native functions executed during execution of a native function that produced the interacted-with portion of the instrumented data). At operation 1636, the query engine 1610 formulates a query for this additional data, which is returned at operation 1638. At operation 1640, the user interface 1612 causes the aggregated version of the portion of the instrumented data to change to depict a different aggregated version of a portion of the instrumented data (including, for example, an aggregation of the new data received).

At operation 1642, the user interface 1612 may receive user interaction with an aggregation of a portion of the sampled data. At operation 1644, the user interface 1612 may send a request to the query engine 1610 for data related to the interacted-with aggregation of a portion of the sampled data (e.g., instrumented data pertaining to native functions called by the functions related to the interacted-with portion of the sampled data). At operation 1646, the query engine 1610 formulates a query for this additional data, which is returned at operation 1648. At operation 1650, the user interface 1612 causes the aggregated version of the portion of the instrumented data to change to depict a different aggregated version of a portion of the instrumented data (including, for example, an aggregation of the new data received).

Figure 17:
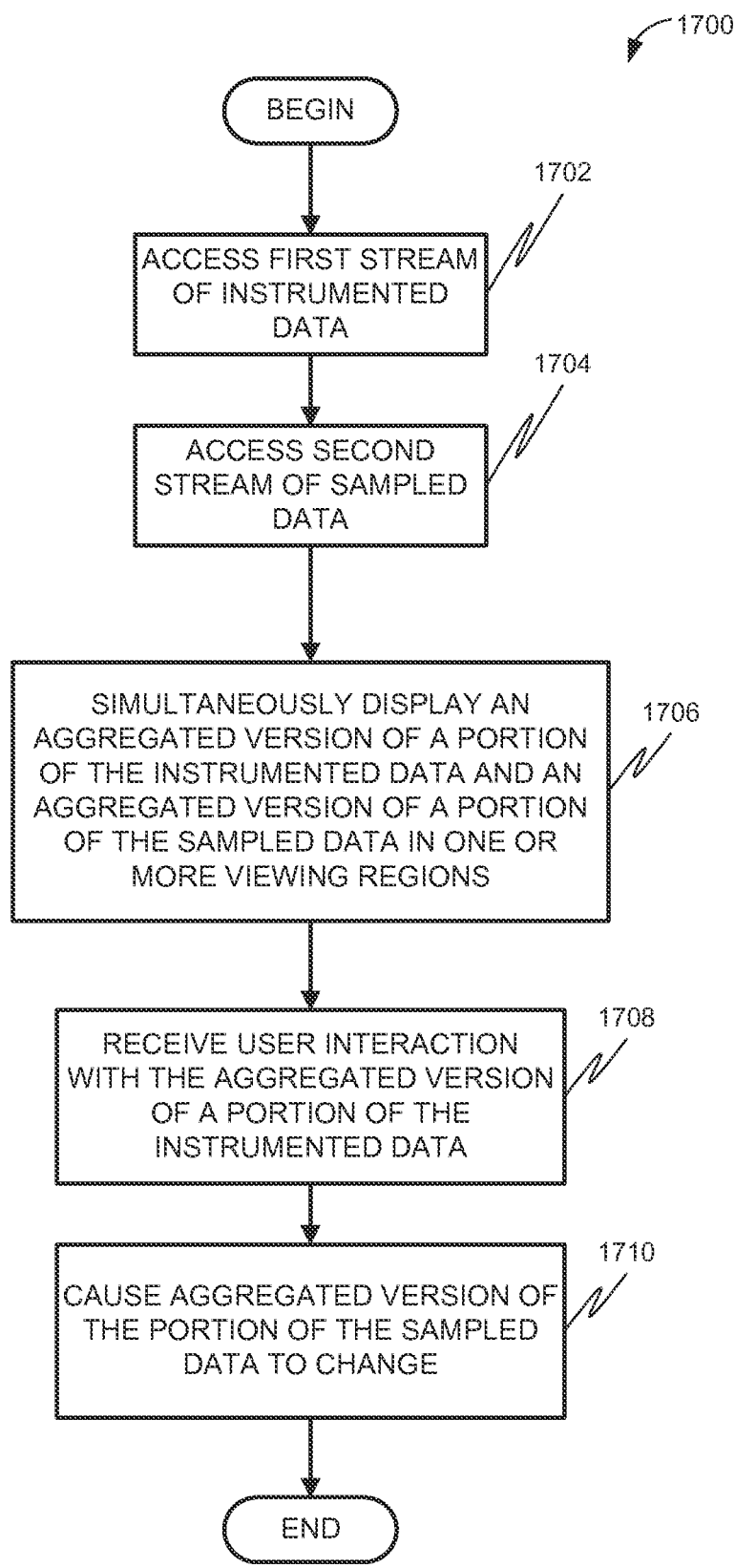
FIG. 17 is a flow diagram illustrating a method, in accordance with an example embodiment, of visually depicting instrumented and sampled data.

FIG. 17 is a flow diagram illustrating a method 1700, in accordance with an example embodiment, of visually depicting instrumented and sampled data. At 1702, a first stream of instrumented data is accessed, the instrumented data collected via execution of code contained in the user-scriptable engine itself. At 1704, a second stream of sampled data is accessed, the sampled data collected by monitoring execution of code contain in user scripts. It should be noted that, in some example embodiments, 1702 and 1704 may occur in parallel. At 1706, an aggregated version of a portion of the instrumented data and an aggregated version of a portion of the sampled data are simultaneously displayed in one or more viewing regions. At 1708, user interaction with the aggregated version of a portion of the instrumented data is received. At 1710, in response to the receiving user interaction with the aggregated version of a portion of the sampled data, the aggregated version of the portion of the instrumented data is caused to change to depict a different aggregated version of a portion of the instrumented data.

Figure 18:
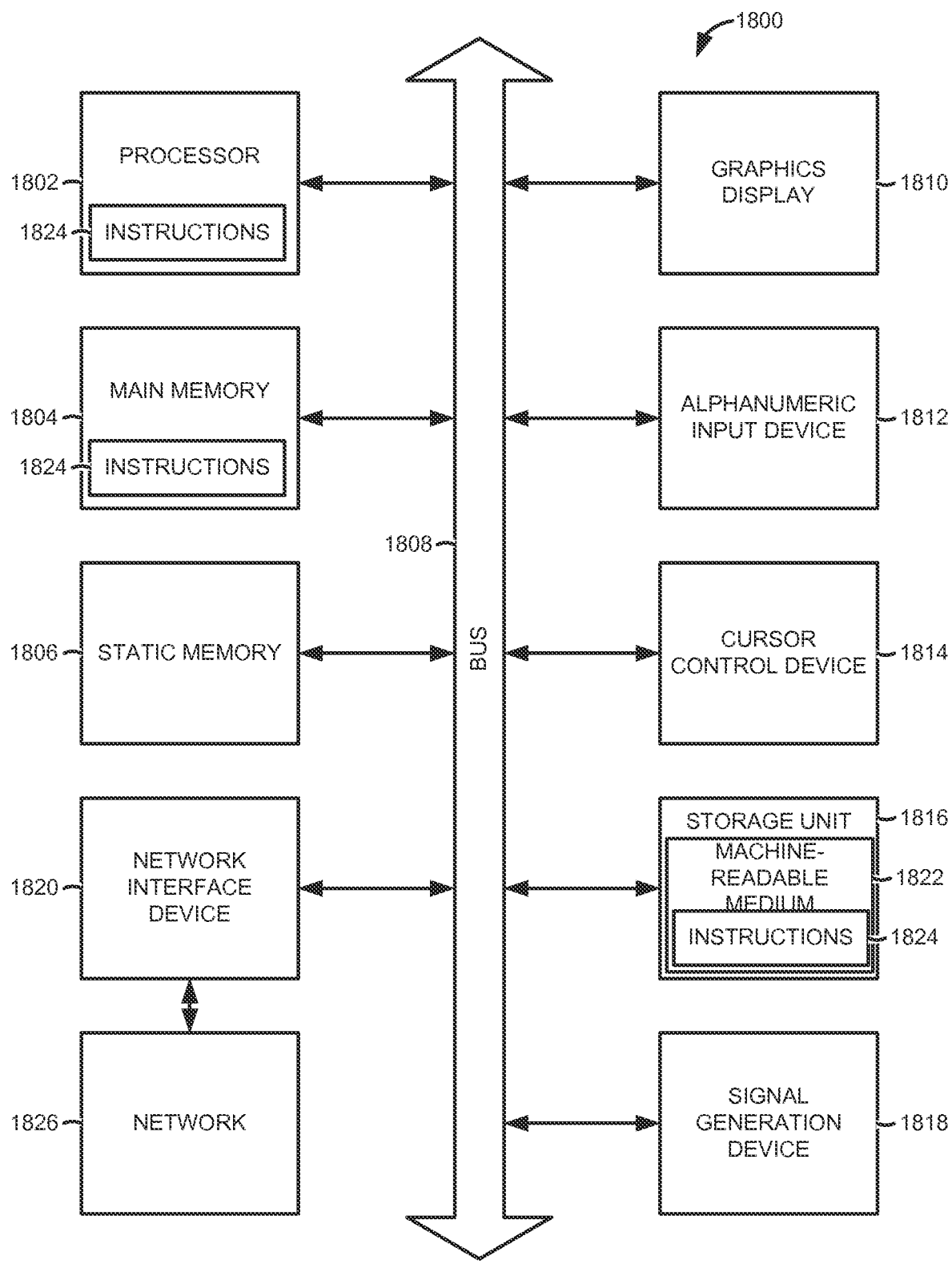
FIG. 18 is a block diagram of a computer processing system, within which a set of instructions may be executed for causing the computer to perform any one or more of the methodologies discussed herein.

FIG. 18 is a block diagram of a computer processing system 1800, within which a set of instructions may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1800 includes processor 1802 (e.g., a central processing unit (CPU), a graphics processing unit (GPU) or both), main memory 1804 and static memory 1806, which communicate with each other via bus 1808. The processing system 1800 may further include graphics display unit 1810 (e.g., a plasma display, a liquid crystal display (LCD) or a cathode ray tube (CRT)). The processing system 1800 also includes alphanumeric input device 1812 (e.g., a keyboard), a cursor control device 1814 (e.g., a mouse, touch screen, or the like), a storage unit 1816, a signal generation device 1818 (e.g., a speaker), and a network interface device 1820.

The storage unit 1818 includes machine-readable medium 1822 on which is stored one or more sets of instructions 1824 and data structures (e.g., software) embodying or utilized by any one or more of the methodologies or functions described herein. The instructions 1824 may also reside, completely or at least partially, within the main memory 1804 and/or within the processor 1802 during execution thereof by the processing system 1800, the main memory 1804 and the processor 1802 also constituting machine-readable, tangible media.

The instructions 1824 may further be transmitted or received over network 1826 via a network interface device 1820 utilizing any one of a number of well-known transfer protocols (e.g., HTTP).

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions 1824. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method of visually depicting instrumented and sampled data, the method comprising:
    accessing a first stream of instrumented data, the instrumented data collected via execution of code contained in a user-scriptable engine;
    accessing a second stream of sampled data, the sampled data collected by monitoring execution of code contained in scripts executed by the user-scriptable engine;
    simultaneously displaying an aggregated version of a portion of the instrumented data and an aggregated version of a first portion of the sampled data in one or more viewing regions;
    receiving a user interaction directly selecting a displayed native function associated with a subset of the aggregated version of the portion of the instrumented data; and
    in response to receiving the user interaction selecting the native function, filtering the aggregated version of the first portion of the sampled data to change to depict only an aggregated version of a second portion of the sampled data that corresponds to sampled data taken while executing the native function.

2. The method of claim 1, the aggregated version of the portion of the instrumented data being located in a first viewing region and the aggregated version of the first and second portions of the sampled data being located in a second viewing region.

3. The method of claim 1, the aggregated version of the first and second portions of the sampled data being located in a first viewing region and the aggregated version of the portion of the instrumented data being located in the first viewing region.

4. The method of claim 1, further comprising:
    a further user interaction—with the aggregated version of the second portion of the sampled data being a selection of a displayed non-native function or category of non-native functions.

5. The method of claim 4, further comprising:
    updating the subset of the aggregated version of the portion of the instrumented data including a depiction of an aggregation of instrumented data from native functions that executed during execution of the selected non-native function or category of non-native functions.

6. The method of claim 1, the user interaction with the aggregated version of the portion of the instrumented data further being a selection of a category of native functions.

7. The method of claim 1, the aggregated version of the second portion of the sampled data including a depiction of an aggregation of sampled data from non-native functions that caused execution, or occurred during the execution, of the selected native function.

8. An apparatus comprising:
    a processor;
    a database storing instrumented data and sampled data, the instrumented data collected via execution of code contained in native function calls, the sampled data collected by monitoring execution of non-native function calls;
    a user interface configured to simultaneously display an aggregated version of a portion of the instrumented data and an aggregated version of a first portion of the sampled data in one or more viewing regions, receive user interaction directly selecting an activity, the activity associated with a subset of the aggregated version of the portion of the instrumented data, and, in response to receiving the user interaction selecting the activity, filtering the aggregated version of the first portion of the sampled data to change to depict only an aggregated version of a second portion of the sampled data that corresponds to sampled data taken inside the selected activity.

9. The apparatus of claim 8, the database being located in a database layer written in an object-oriented programming language.

10. The apparatus of claim 8, the user interface being located in a user interface layer written in a lightweight multi-paradigm programming language designed as a scripting language having extensible semantics.

11. The apparatus of claim 9, the database storing telemetry data from a user-scriptable engine, the telemetry data being transferred to the database in three layers, one layer being a network layer, one layer being a format to serialize objects, and one layer being a telemetry layer defining a particular set of data formats understandable by the serialization layer that are used to transmit the instrumented and sampled data.

12. The apparatus of claim 11, the telemetry data being stored by the database as sessions.

13. The apparatus of claim 9, the database layer further comprising a query engine configured to receive requests for data generated by the user interface and retrieve information from the database in response to the requests.

14. A non-transitory machine-readable storage medium comprising a set of instructions which, when executed by a processor, causes execution of operations comprising:
- accessing a first stream of instrumented data, the instrumented data collected via execution of code contained in a user-scriptable engine;
- accessing a second stream of sampled data, the sampled data collected by monitoring execution of code contained in scripts executed by the user-scriptable engine;
- simultaneously displaying an aggregated version of a first portion of the instrumented data and an aggregated version of a first portion of the sampled data in one or more viewing regions;
- receiving a user interaction directly selecting a display object, the display object associated with a subset of the aggregated version of the first portion of the instrumented data; and
- in response to receiving the user interaction selecting the display object, filtering the aggregated version of the first portion of the sampled data to change to depict only an aggregated version of a second portion of the sampled data, that corresponds to sampled data related to the display object.

15. The non-transitory machine-readable storage medium of claim 14, the set of instructions further causing execution of the following operations:
- receiving a subsequent user interaction directly selecting a piece of the aggregated version of the second portion of the sampled data; and
- in response to receiving the subsequent user interaction selecting the piece of the aggregated version of the second portion of the sampled data, filtering the aggregated version of the portion of the instrumented data to change to depict an aggregated version of a second portion of the instrumented data corresponding to the selected piece.

16. The non-transitory machine-readable storage medium of claim 15, wherein, the piece of the aggregated version of the second portion of the sampled data that is selected is a displayed non-native function or category of non-native functions.

17. The non-transitory machine-readable storage medium of claim 16, the aggregated version of the second portion of the instrumented sampled data including instrumented data from native functions that executed during execution of the selected non-native function or category of non-native functions.

18. The non-transitory machine-readable storage medium of claim 14, the user interaction directly selecting the display object, wherein the display object is one of hierarchical nested display objects, the hierarchical nested display objects including vector art, bitmaps, and text.

19. The non-transitory machine-readable storage medium of claim 15, the aggregated version of the second portion of the instrumented data including a depiction of an aggregation of sampled data from non-native functions that caused execution of the selected native function or category of native functions.

* * * * *

UNITED STATES PATENT AND TRADEMARK OFFICE
CERTIFICATE OF CORRECTION

PATENT NO. : 10,613,965 B2
APPLICATION NO. : 13/829844
DATED : April 7, 2020
INVENTOR(S) : Mark Edward Shepherd et al.

Page 1 of 1

It is certified that error appears in the above-identified patent and that said Letters Patent is hereby corrected as shown below:

In the Specification

Column 3, Line 53, delete "Google." and insert -- Google, --, therefor.

In the Claims

Column 16, Line 21, Claim 17, after "instrumented" delete "sampled".

Signed and Sealed this
Twenty-sixth Day of May, 2020

Andrei Iancu
*Director of the United States Patent and Trademark Office*